United States Patent [19]

Kitai et al.

[11] 4,041,511
[45] Aug. 9, 1977

[54] DRIVING DEVICE OF LENS SHUTTER OF SINGLE-LENS REFLEX CAMERA

[75] Inventors: Kiyoshi Kitai, Tokyo; Yukio Nakamura, Yotsukaido; Shogo Kato, Daiei; Shinji Nagaoka, Yotsukaido, all of Japan

[73] Assignee: Seiko Koki Kabushiki Kaisha, Japan

[21] Appl. No.: 462,181

[22] Filed: Apr. 18, 1974

[30] Foreign Application Priority Data

Apr. 19, 1973 Japan .................................. 48-43650

[51] Int. Cl.² ............................. G03B 9/00; G03B 9/10
[52] U.S. Cl. ................................... 354/232; 354/250; 354/259; 354/262; 354/264
[58] Field of Search ............... 354/230, 231, 232, 250, 354/256, 259, 261, 262, 264

[56] References Cited

U.S. PATENT DOCUMENTS

| 3,094,913 | 6/1963 | Movelle | 354/232 |
| 3,158,075 | 11/1964 | Ohara | 354/156 |
| 3,191,514 | 6/1965 | Ohara | 354/156 |

*Primary Examiner*—Russell E. Adams
*Attorney, Agent, or Firm*—Robert E. Burns; Emmanuel J. Lobato; Bruce L. Adams

[57] ABSTRACT

A lens shutter for a quick-return single-lens reflex camera in which the diaphragm blades and shutter blades are operated by an operating ring driven rotationally in opposite directions by a driving device. The driving device has a pair of axially biased rods that coact to sequence their travel axially in two directions for driving the operating ring through gear racks on one of the rods and a driving ring coupled to the operating ring. A pinion meshes with both gear racks. A stop lever releasably locked by a signal lever stops the operating ring temporarily during taking of an exposure and the signal lever releases the stop lever at the end of an exposure which it signals or indicates. A cocking mechanism comprising a plurality of levers cocks the operating rods to cock the shutter.

4 Claims, 10 Drawing Figures

DRIVING DEVICE OF LENS SHUTTER OF SINGLE-LENS REFLEX CAMERA

BACKGROUND OF THE INVENTION

This invention relates generally to shutters for quick-return type single-lens reflex cameras and more particularly to a driving device for such shutters.

Mechanisms for driving guide-return type single-lens reflex shutters are generally constructed quite complex. The manner of coupling the driving device with the shutter-operating element or elements is generally complex. The cocking mechanism for cocking the shutter coupled to the driving device is generally coupled thereto by complex mechanism.

SUMMARY OF THE INVENTION

It is a principal object to provide a new and improved, simple driving device or mechanism for a lens shutter for a quick-return type single-lens reflex camera.

Another object is to provide a cocking mechanism for the shutter associated with the driving device.

The lens shutter according to the invention comprises an operating ring driven by a driving ring rotatably driven by a gear rack on the driving ring meshing with a driven pinion. A gear rack on one of two axially driven rods drives the pinion. The rods are driven axially in opposite directions for opening the diaphragm and closing the shutter then opening the shutter and closing the diaphragm.

The operating ring operates the diaphragm blades and shutter blades while rotating in both directions when driven by the driving device through the driving ring. The operating ring is stopped during its rotation by a stop lever for taking of an exposure. The stop lever is releasably locked during this period by a signal lever which signals the termination of the period thereby signalling termination of an exposure.

A plurality of coupled levers coupled to the driving rods cocks the driving rods thereby cocking the shutter.

BRIEF DESCRIPTION OF THE DRAWINGS

Other objects and advantages will appear from the following description of an example of the invention, and the novel features will be particularly pointed out in the appended claims.

DESCRIPTION OF A PREFERRED EMBODIMENT

Figure 1:
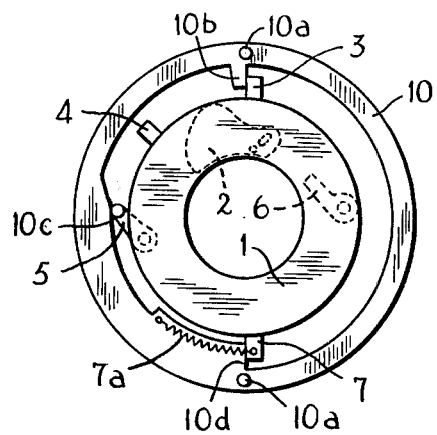
FIGS. 1-5 inclusive are plan views of a lens shutter embodying a driving device according to the invention and illustrate various operating conditions of the shutter.

As illustrated in the drawings a lens shutter according to the invention a shutter case having an exposure or lens aperture has a plurality of shutter blades 2 disposed about the aperture. Only one of the several shutter blades is illustrated. The shutter has a well known set lever 3 and a shutter-release lever 4. A shutteropening lever 5 for opening the shutter separately from the opening thereof in taking of an exposure. A signal lever 6 pivotally mounted indicates or signals completion of the exposures. A stop 7 is coupled by a spring 7a to an operating ring 10.

The operating ring 10 has a pin 10a and an inward projection 10b that engages with and operates the set lever 3 and the release lever 4. A cam 10c provided on the operating ring 10 operates the opening lever 5 and a step 10d engages the stop 7. The operating ring pin 10a fits into a hole 20a of a driving ring 20 arranged toward the camera side. This provides a coupling for driving ring and operating ring operating together.

The driving ring has an elongated, arcuate slot through which is pivotally mounted a stop lever 21. The stop lever has an arm 21a engageable with and releasably held by the signal lever when the shutter is being driven by the driving ring. A second arm actuates the stop lever 21 to the position of engagement with the signal lever. This arm 21b is engaged by a tab 20b, normal to the plane of the drawing, on the operating ring 20 when the shutter is charged. A third arm 21c on the stop lever 21 can assume a position of locking the pin 20c on the driving ring.

The driving ring 20 is coupled with a driving mechanism of the camera by means of a gear rack on the periphery thereof and a pinion 22. The driving mechanism comprises a first driving rod 23 operable axially and having a second gear rack 23c meshing with the pinion; a second driving rod 24 coupled to the first driving rod 23 by a driving spring 25. The first driving rod is engageable with a first charging lever 28 by means of a pin 23a and has a hook or projection 23b hooked by a release lever 32.

The second driving rod 24 has a pin 24a which is engageable with a second charge lever 29 and a projection 24b engages with a projection 23d of the first driving rod. A second driving spring 26 is connected to the second driving rod and biases it to the right against a stop 40. The second driving rod 24 has a projection 24c engageable with and releasably held by a pivoted locking element or claw 31a which has an arm 31 engageable by an end 23e of the first driving rod for disengaging the locking element.

A lifting lever 27 pivotally mounted on a camera lifting axis engages a pin 28a by a cam 27a is coupled to the second charging lever 29 through a pin 29a on the second charging lever received in an elongated slot of an intermediate lever 30 which is pivoted on the lifting lever by a pin 27b.

OPERATION

Figure 2:
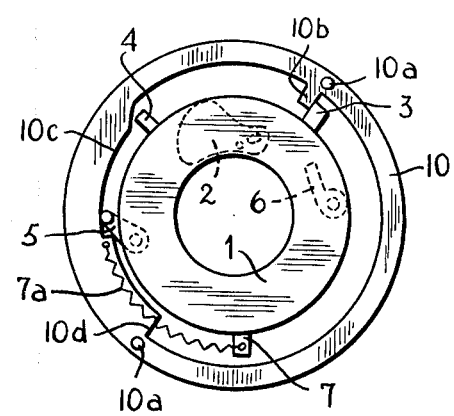
Figure 6:
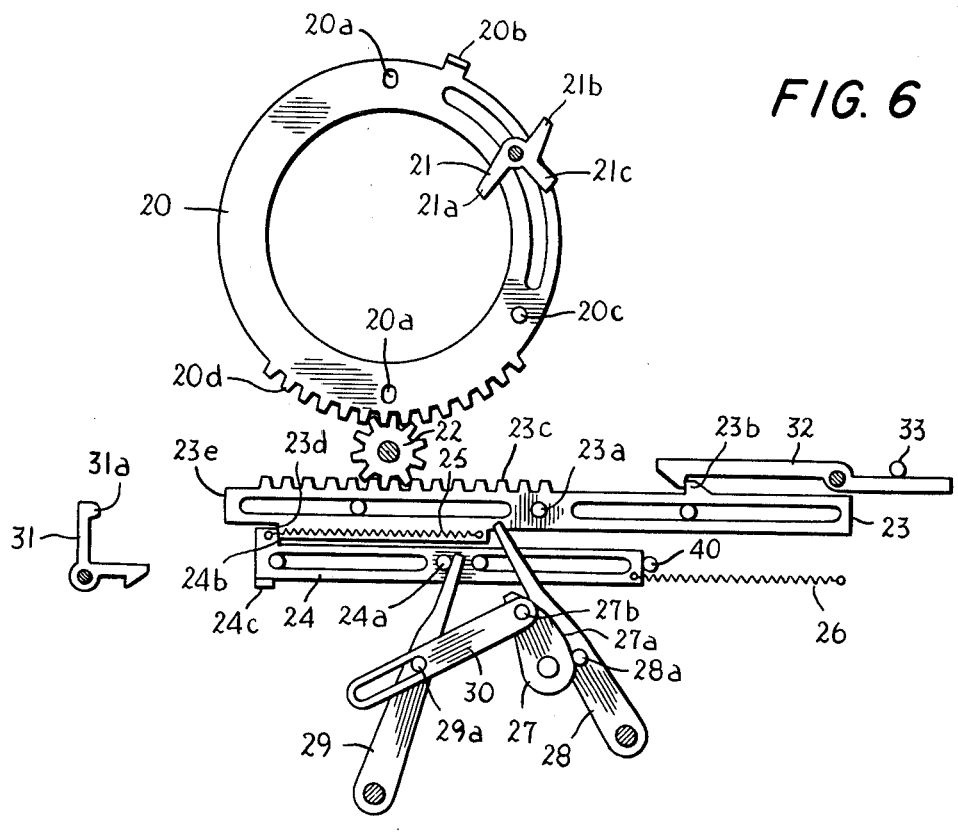
FIGS. 6-10 inclusive are plan views of the lens shutter in FIGS. 1-5 and illustrate various operating conditions of the driving device thereof.
Figure 7:
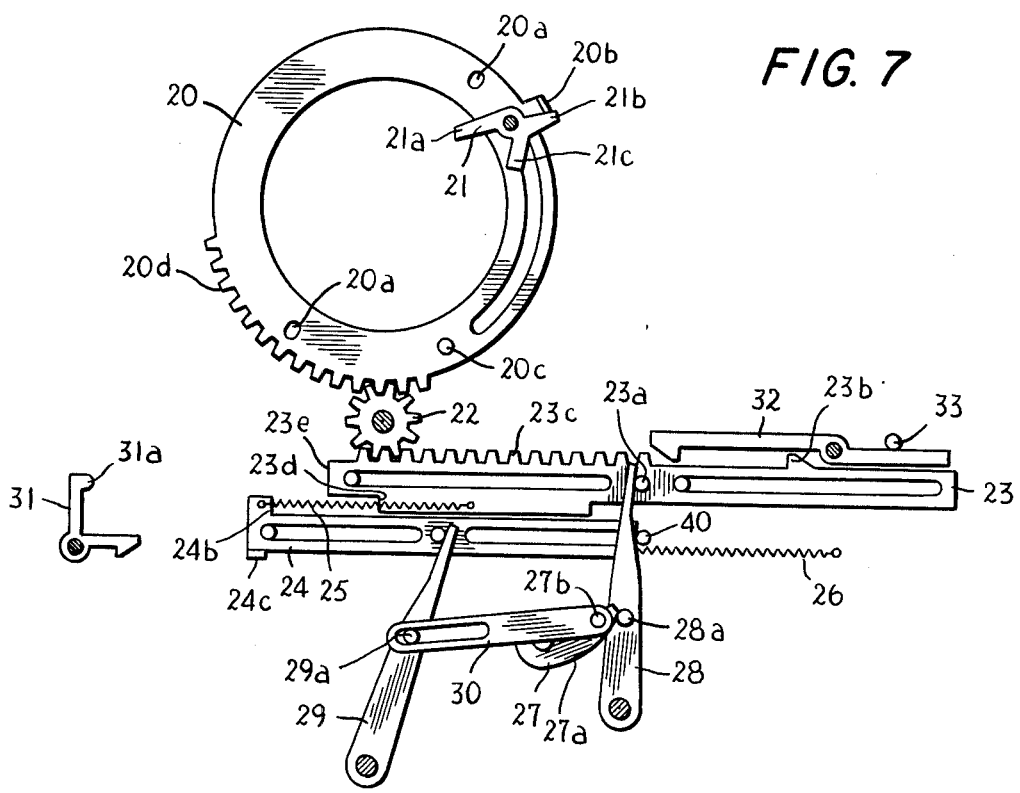

FIGS. 1 and 6 illustrate the shutter after completion of an exposure. In this state the shutter blade opening lever 5 is pushed down by a cam 10c of the operating ring 10 of the shutter and the blades are open. When the cocking operation is started by rotation of the cocking lever 27 of FIG. 6 in a clockwise direction the cam 27a of the cocking lever pushes the pin 28a of the first charging or cocking lever 28 to rotate the first charging lever in a clockwise direction and thereby to push the pin 23a on the first driving rod to the right by the first charge lever 28. Consequently the driving ring 20 is rotated in a clockwise direction through the pinion 22 and the operating ring 10 of the shutter which is linked as a unit with the driving ring 20 which also rotates in a clockwise direction so that the projection 10b pushes the set lever 3 in a clockwise direction to charge the shutter. (See FIGS. 2 and 7.) At the same time the signal lever 6 in the shutter is also charged and moreover arm 21b of the stop lever (which is urged in a clockwise direction by a spring, not shown) is charged in a clockwise direction by the tab 20b of the driving ring 20 and the stop lever is locked by the signal lever. When the cocking lever 27 is rotated in a clockwise direction the pin 28a on the first charge lever crosses over cam 27a and returns to the position shown in FIG. 6 at the position that the cocking lever 27 rotates 180 degrees.

Accordingly the first driving rod 23, the driving ring 20 and the operating ring 10 also return to the position shown in FIGS. 6 and 1.

Figure 8:
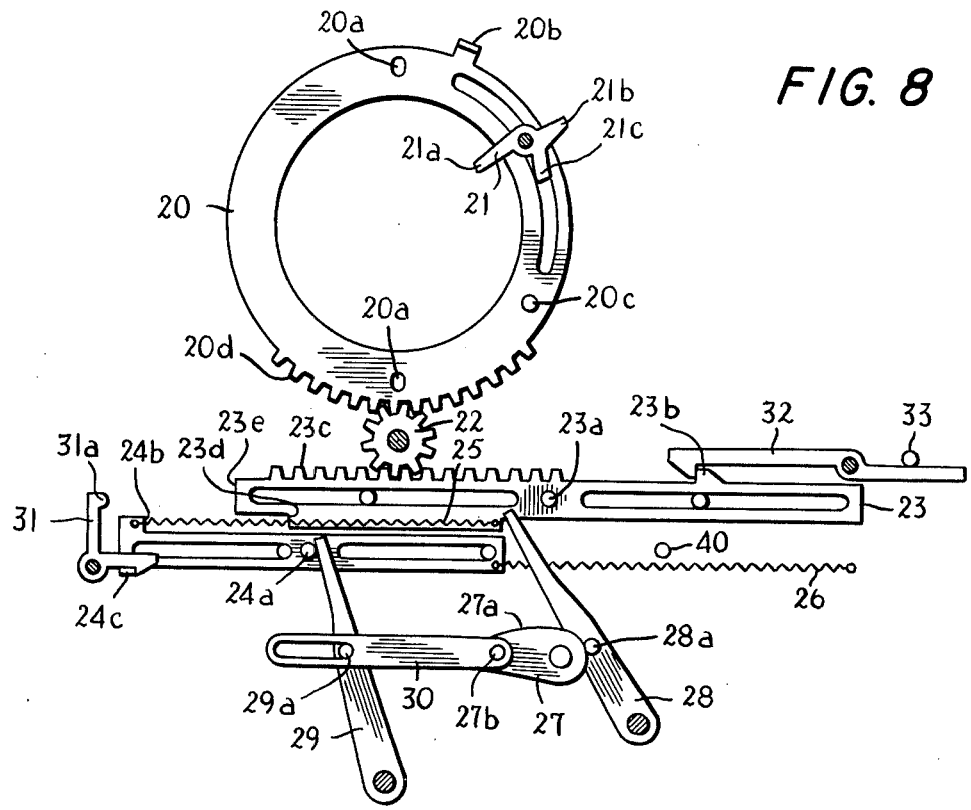

By successive clockwise rotation of cocking lever 27, the second charge lever 29, which did not move in the first half of the rotation, is pushed in a counterclockwise direction through the intermediate lever, which is pivoted on the cocking lever 27 and pushes pin 24a on the second driving rod 24 to the left to charge the second driving rod. At this moment the first driving rod 23 is locked by the release lever. Therefore driving ring 20 does not rotate, but only the second driving rod 24 is charged toward springs 25 and 26 and is locked at the charge position by the second driving rod locking claw (FIG. 8). The second charge lever returns to the original position at the position, where the cocking lever 23 rotates one turn, and charging of the shutter and driving mechanism is completed.

Figure 3:
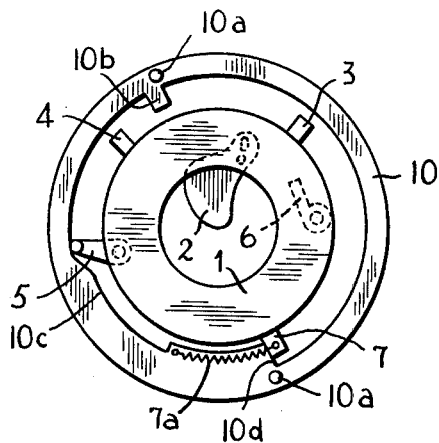

Next an exposure operation is described. When the release lever 32 is actuated in a clockwise direction by the camera release button (not illustrated) to release the locking of the first driving rod 23, the first driving rod 23 is driven to the left by the first driving spring 25. Consequently the operating ring 10 of the shutter rotates in a counterclockwise direction and the pressing of the opening lever 5 by its cam 10c is released and the blades are closed. (FIG. 3). Furthermore the first driving rod moves to the left, rotates the operating ring in a counterclockwise direction and releases the shutter by pushing the shutter release lever 4 by its projection 10b. Thus the blades are opened. At this moment the stopping operation board 7, too, is rotated in the same direction by a step 10d of the operating ring 10 and thus a preset stopping aperture can be gained.

Figure 4:
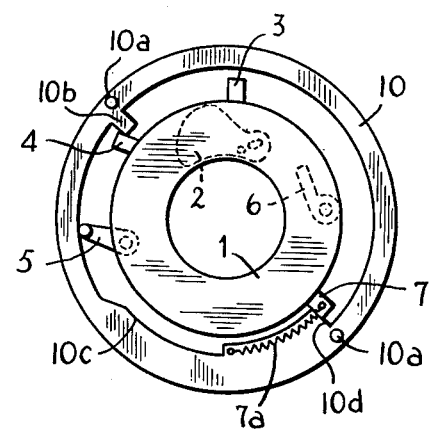
Figure 5:
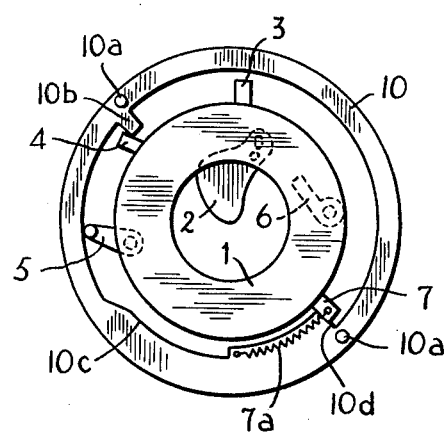
Figure 9:
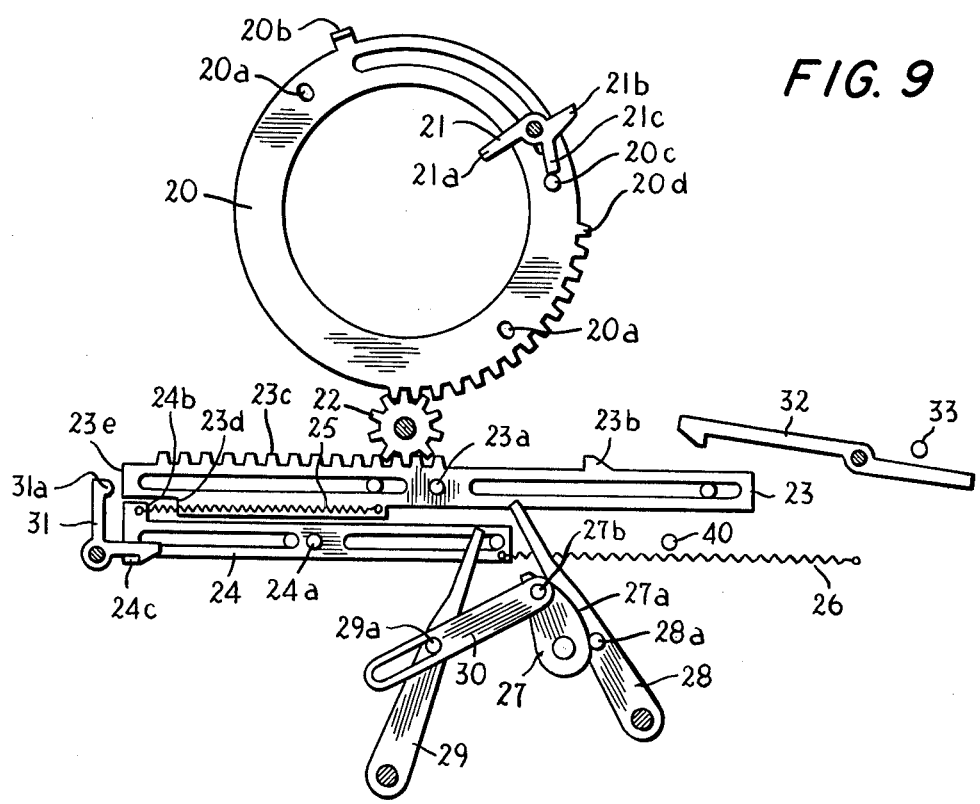
Figure 10:
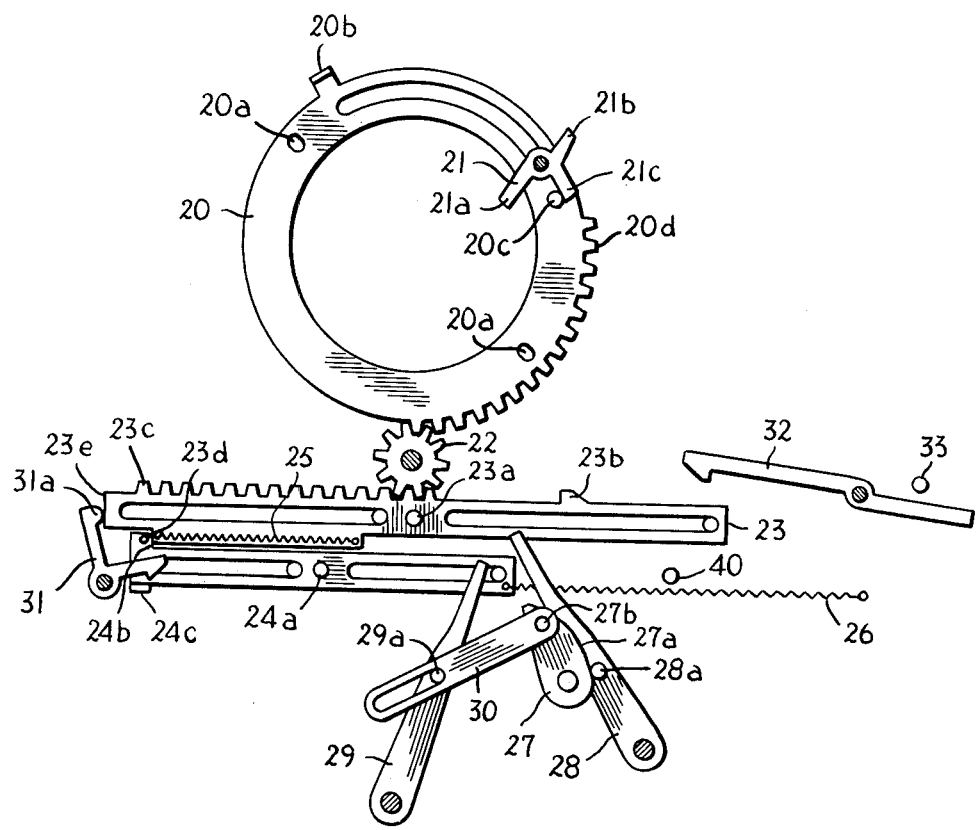

On the one hand the driving ring 20 has its rotation temporarily stopped by a pin 20c contacting with the arm 21c of the stop lever 21. Therefore the operating ring 10, driving ring 20 and the first driving rod have their operation temporarily stopped immediately after shutter release (FIGS. 4 and 9); when a predetermined exposure time is over the shutter blades are again closed and exposure is completed. At the same time the signal lever 6 rotates in a counterclockwise direction to free itself from the arm 21a of the stop lever 21 to release its locking. The stop lever 21 rotates in a counterclockwise direction by its spring force and releases the contact between the pin 20c of the driving ring 20 and arm 21c. The unlocked driving ring 20 rotates further in a counterclockwise direction by the first driving rod 23, but the left end of the first driving rod 23 contacts with the arm 31a of the second driving locking claw 31 to release the second driving rod 24 from locking by pushing round arm 31a in a counterclockwise direction. (FIG. 5 and FIG. 10). The unlocked second driving rod 24 is driven to the right by the action of the second driving spring 26. At this moment the projection 24b of the second driving rod 24 contacts with the step 23d of the first driving rod 23 and the first driving 25 has its action stopped and the first driving rod 23, too, is driven to the right by the action of the second driving spring 26. Consequently, both the driving ring 20 and the operating ring 10 are also driven in a clockwise direction and return to the position shown in FIG. 1 and FIG. 6.

As a matter of course, blades 2 reopen since opening lever 5 is again pressed down by cam 10c of the operating ring 10 and simultaneously opens the iris. As above-mentioned, according to this invention the linking of the driving mechanisms of both the shutter side and camera side becomes possible by a single axis with pinion 22 and can subsequentially simplify the usual quick-return type single-lens camera mechanism. In this example the driving ring 20 is arranged, but naturally, instead operating ring 10 can be directly linked with pinion 22 by putting a gear rack on the operating ring 10.

What we claim and desire to secure by Letters Patent:

1. A lens shutter for a single-lens reflex camera comprising, shutter blade means, an operating ring for operating said shutter blade means for closing the shutter and opening the shutter, a driving device for driving the operating ring in opposite directions for effecting control of the shutter blade means and for driving said operating ring for cocking the shutter, said driving device comprising two operating rods driven axially in opposite axial directions, a first gear rack on one of said rods for driving the operating ring, coupling means coupling the gear rack to the operating ring, and said rods having means coactive for sequencing the reversal of direction of travel of both rods.

2. A lens shutter for a single-lens reflex camera according to claim 1, in which said coupling means comprises a driving ring having a second gear rack thereon and a pinion meshing with both the first and the second gear racks.

3. A lens shutter for a single-lens reflex camera according to claim 2, including a stop lever for releasably stopping said operating ring for a period of time corresponding to the taking of an exposure, a signal lever for releasably locking said stop lever during said period and for signalling termination of said period.

4. A lens shutter for a single-lens reflex camera according to claim 3, including a cocking mechanism comprising a plurality of coactive levers actuatable for displacing said rods for cocking the driving device.

* * * * *